UNITED STATES PATENT OFFICE.

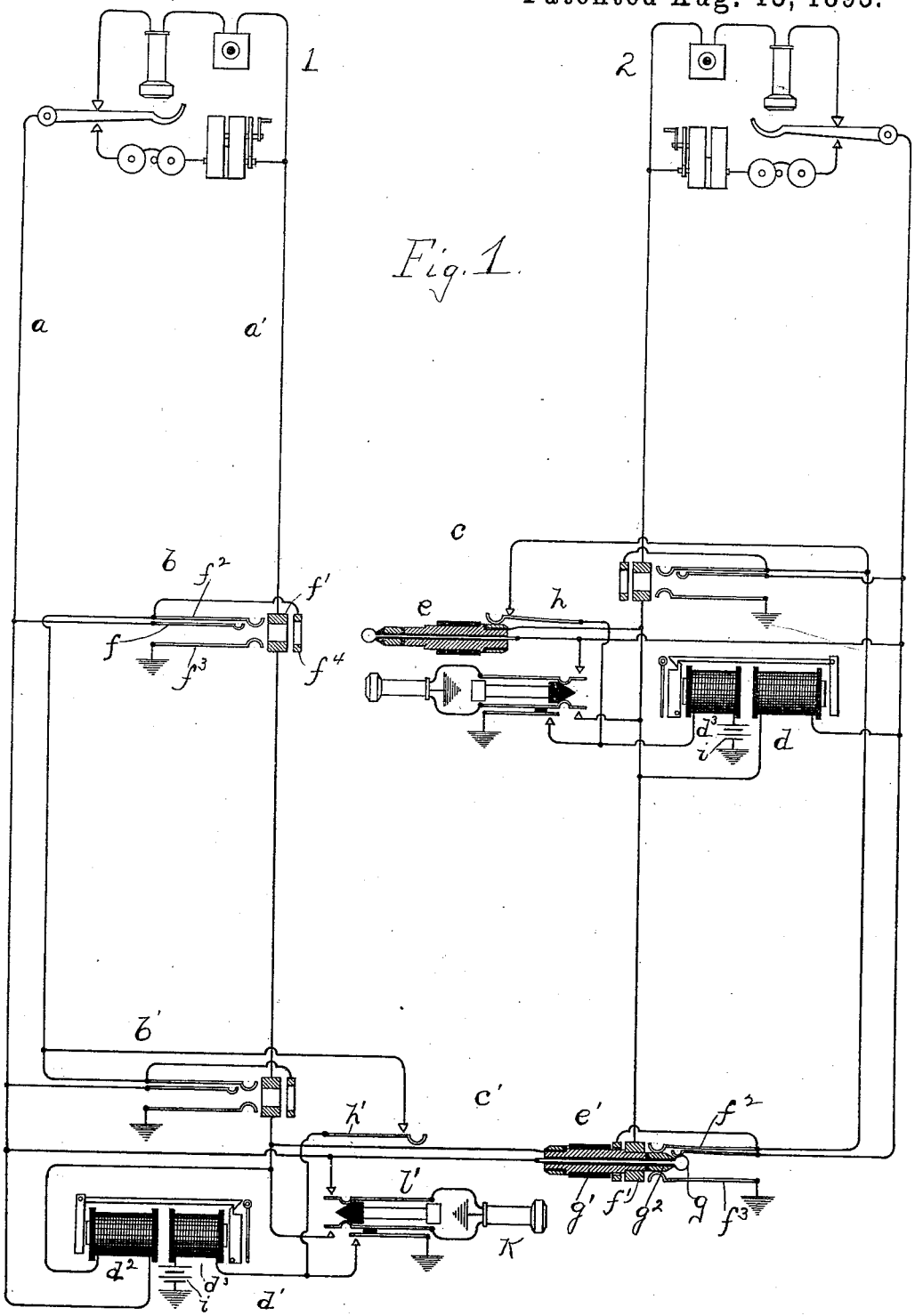

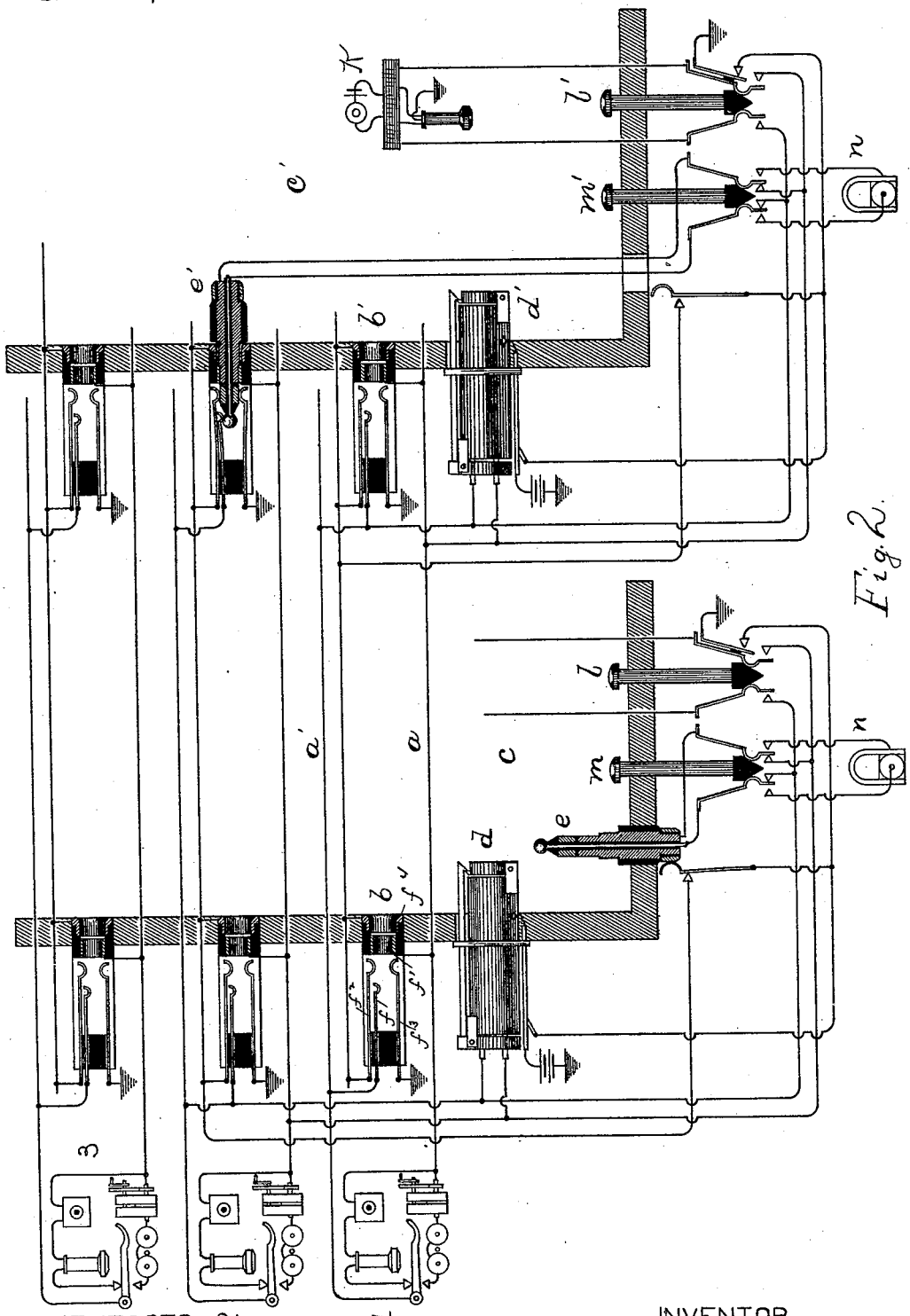

ORO A. BELL, OF BROOKLYN, NEW YORK, ASSIGNOR TO THE WESTERN ELECTRIC COMPANY, OF CHICAGO, ILLINOIS.

MULTIPLE-SWITCHBOARD SYSTEM.

SPECIFICATION forming part of Letters Patent No. 544,341, dated August 13, 1895.

Application filed February 21, 1893. Serial No. 463,202. (No model.)

*To all whom it may concern:*

Be it known that I, ORO A. BELL, a citizen of the United States, residing at Brooklyn, in the county of Kings and State of New York, have invented a certain new and useful Improvement in Multiple-Switchboard Systems, (Case No. 9,) of which the following is a full, clear, concise, and exact description, reference being had to the accompanying drawings, forming a part of this specification.

My invention relates to multiple-switchboard apparatus, being more particularly concerned with certain details of construction by which the provision of a special clearing-out annunciator is avoided and by which an operator at one section of switchboard is enabled to test to determine whether any line is busy or in use through a connection upon some other section of the switchboard.

Heretofore in multiple-switchboard systems each line has been provided with an annunciator having a separate electromagnet adapted, when energized, to reset or restore the indicator of the annunciator to its normal position if it has been operated or to retain it irresponsive to subsequent signaling currents through the annunciator, this special electromagnet being included in a local circuit, which is arranged to be closed by the insertion of a connecting-plug into any spring-jack of the line. The local circuit serves also as a testing-circuit, each for its particular line. The completion of the circuit alters the electrical condition of an exposed contact-piece upon each spring-jack of the line, and suitable testing apparatus is provided by which the electrical condition of the exposed contact-piece may be tested, from which it may be determined at any switchboard whether a connecting-plug is inserted in any other spring-jack of the line. Thus the establishment of connection between two lines renders the individual annunciator of both lines irresponsive to signaling-currents. A special clearing-out annunciator is therefore connected with the cord-circuit joining the two lines to receive and indicate the signal for disconnection.

In my invention I have aimed to dispense with the special clearing-out annunciator and to utilize the individual annunciator of the call-initiating line for receiving the clearing-out signals, at the same time providing means for altering the electrical condition of the testing-contacts to permit of the usual test to determine whether the line is in use or not.

My invention is particularly applicable to the type of switchboard known as the "single-cord" board, in which each telephone-line is connected with a spring-jack or terminal upon each section of the multiple switchboard, and terminates at the switchboard whereon its annunciator is located in a connecting-plug adapted for insertion into a spring-jack of any other line. When it is so applied I provide a cord-switch in the socket wherein the terminal plug of the line rests when idle, the cord-switch being so connected with the local circuit as to affect the condition of the test-contacts in the same manner as the insertion of a plug into a spring-jack of the line would do, but without closing the local circuit through the restoring-coil of the annunciator. Thus, when in response to a signal from any line, the operator raises the terminal plug of that line and inserts it into a spring-jack of the line called for, the test-contacts of both lines are put in condition to give the busy-signal in response to a test— the calling-line through the medium of its cord-switch, and the answering-line through its spring-jack—while the individual annunciator of the latter line is rendered irresponsive to signaling-currents, the annunciator of the calling-line remaining in condition to indicate the disconnection-signal.

My invention is illustrated in the accompanying drawings, in which—

Figure 1 represents two telephone-lines, each extending from a sub-station to a central station and connected thereat with two spring-jacks upon different switchboards, and with an annunciator and terminal plug upon one of the switchboards, the calling-keys being omitted for the sake of clearness. In Fig. 2 three telephone-lines are shown connected with spring-jacks, annunciators, and terminal plugs upon the two different switchboards, the apparatus being shown in greater detail.

Referring to Fig. 1, the apparatus shown at 1 and 2 is supposed to be the equipment of two telephone-stations 1 and 2. The apparatus comprises the usual telephonic and signaling appliances and a switch, wherein the telephone may be hung, adapted to connect the signaling appliances or the telephone with the circuit, according to whether the telephone rests upon or is removed from the switch-hook.

The apparatus—for example, that of station 1—is connected by lines $a$ $a'$ with two spring-jacks $b$ and $b'$, which are assumed to be upon two different sections $c$ and $c'$ of a multiple switchboard. The lines $a$ $a'$ also extend to and are connected with an annunciator $d'$ upon the switchboard $c'$ and terminate in a connecting-plug $e'$. The annunciator $d$ and terminal plug $e$ of the lines to station 2 are located upon the board $c$, so as to be under the attendance of a different operator. Each of the spring-jacks—for example, jack $b$—comprises two line contacts, a spring $f$ and a thimble or contact-ring $f'$, and two local contact-springs $f^2$ $f^3$. The spring $f$ and the ring $f'$ are connected with the telephone-line itself, while the springs $f^2$ $f^3$ constitute the normally open or separated terminals of the local circuit. A test-piece $f^4$ is placed at the front of the jack, so as to be readily accessible for testing, and is electrically connected with the local spring $f^2$. The contact-pieces of the spring-jacks are so arranged with relation to the connecting-plugs, as $e'$, that when a plug is inserted into a spring-jack the tip $g$ and sleeve $g'$ of the plug make contact with the line-spring $f$ and line-thimble $f'$, respectively, while the short sleeve or ring $g^2$ of the plug crosses together the two local springs $f^2$ $f^3$. The terminal plug, as $e'$, rests, when out of use, in a cord-switch $h$, having contact-points tending to separate, but kept in connection by the pressure of the plug when in its socket.

The annunciator is of well-known character. It comprises two electromagnets, one of which $d^2$ is arranged to release a shutter or indicator when energized, and the other of which $d^3$ acts to retract the shutter into its normal position when current finds circuit through it. The coil $d^2$ is included in circuit with the line-wires $a$ and $a'$.

The restoring-coil $d^3$ is contained in the local circuit, which may be traced from the spring $f^2$ of spring-jack $b$ to the similar spring of spring-jack $b'$, thence through the normally-closed contacts of the cord-switch $h'$ and the restoring-coil $d^3$ of the annunciator to the battery $i$, and thence to earth. All the local springs $f^3$ of the different spring-jacks are grounded directly. Thus when a connecting-plug is inserted into one of the spring-jacks the terminal plug of that line being in its cord switch, the local circuit is closed through the local springs $f^2$ and $f^3$ and the insulated ring $g'$ upon the plug, restoring the annunciator. Normally the test-pieces $f^4$ of the different spring-jacks of each line are electrified to a difference of potential from the earth by the presence of the battery $i$ in the earth branch. Hence as long as the line is not in use a grounded testing-plug applied to any test-contact $f^4$ would receive current therefrom and will give a signal, which will be interpreted as indicating that the line is not in use, but when a plug is inserted into the spring-jack the test-contact $f^4$ is connected directly to earth through the springs $f^2$ and $f^3$ and the ring upon the plug, and thus imparts no current to the testing-plug.

An operator's telephone $k$ is provided, connected with the springs of a listening-key $l'$, whose contact-anvils are connected with the line circuit $a$ $a'$, so that by the depression of the plunger of the key the telephone may be connected with the line-circuit to enable the operator to communicate with the subscriber. An additional pair of contacts, normally open, are provided upon the key, adapted to complete the circuit directly through the restoring-coil $d^3$ of the annunciator to reset the latter each time the telephone is brought into circuit.

In the operation of the system a call-signal sent from the generator of a sub-station, as sub-station 1, operates the individual annunciator $d'$ of that line. The attendant operator places the listening-key $l'$ in position to connect the telephone $k$ with the line-circuit and receives the order from the subscriber for the connection desired. She then raises the terminal plug $e'$ of the line from its socket and applies its tip to the test-ring $f^4$ of the line called for. If the line tested be in use a circuit is formed from the test-ring through the tip of the plug to the key $l'$, thence through a portion of the coil of telephone $k$ and to earth, causing a click in the telephone, and thus indicating to the operator the condition of the line. Finding the line not in use, she inserts the plug, as $e'$, fully into the spring-jack which she has been testing, whereby the telephone-circuit of the calling-station is continued through its terminal plug, the spring-jack of the answering-line, and the line-wires to the answering-station. At the same time, by the insertion of the plug $e'$ into the spring-jack to complete the connection, the grounded local spring $f^3$ is connected with the other local contact $f^2$, whereby the local circuit is completed from ground at that spring-jack through the contact-points of the cord-switch $h$ and the restoring-coil $d^3$ of the annunciator $d$ to the battery $i$, and thence to the earth. The magnet $d^3$ is thus energized and attracts its armature, preventing the operation of the annunciator and the display of the indicator by any subsequent signaling-current. The test-pieces $f^4$ of the different spring-jacks of that line, being grounded, no longer give the idle signal when tested. The local circuit of the calling-line is, however, not closed through its restoring-annunciator, since no plug is inserted into any of its spring-jacks, but the cord-switch $h'$ has been actuated by the removal of the terminal plug $e'$ from its socket to disconnect the portion of the local circuit which is connected with the test-contacts of the line from the remainder of the circuit, including the battery $i$. Hence the test-contacts of line to station 1, having no longer any difference of potential from the earth, will also test "busy" to any operator testing. When the listening-key $l'$ was thrown into position to connect the operator's telephone $k$ with the line-circuit, its local contacts were closed together and closed the local circuit of battery $i$ through the restoring-coil $d^3$ of that annunciator. The restoring-magnet, being energized, attracted its shutter and replaced the indicator to its normal position.

Having thus established the desired connection and determined that the subscribers are in communication, the operator allows the plunger of key $l'$ to rise, which disconnects the telephone $k$ from the line-circuit and also opens the local circuit through the restoring-coil of the annunciator $d'$, leaving the annunciator free to respond to a signaling-current.

When the subscribers have finished their conversation, either of them, by rotating his calling-generator, may send such a signaling-current, operating the annunciator $d'$ and thus indicating to the operator at board $c'$ that the connection is no longer required.

In Fig. 2 the apparatus shown is essentially similar to that of Fig. 1, but is represented in greater detail, the form and disposition of the different parts upon the switchboards being fully shown.

Two switchboards are herein represented, as in Fig. 1, each having one spring-jack connected with each of the three telephone-lines. The terminal plugs and annunciators of two of the lines are shown connected with their respective lines, but those of the third line to station 3 are omitted to avoid complication of the drawings. A calling-key $m$ is shown included in each circuit between the line and the terminal plug, the key being arranged to disconnect both contacts of its terminal plug from the line and to connect them to the poles of a calling-generator $n$. By depressing the plunger of the calling-key the operator is enabled to send a calling-current over any line into whose spring-jack the terminal plug is inserted.

My invention is obviously not confined to its application to the single-cord type of switchboard or in connection with the specific apparatus, which I have herein described, and I do not limit myself to these specific forms, but

I claim, broadly, as new and desire to secure by Letters Patent—

1. The combination with a telephone line connected with springjacks upon different switchboards and terminating in a connecting plug at one of the switchboards, of a test circuit independent of the line circuit extending to the different springjacks and connected with test contacts near the same, and a cord switch for the said terminal plug adapted to alter the connection of the test circuit with a source of electricity to change the electrical condition of the test contacts, when the plug is removed from its socket, substantially as described.

2. The combination with a telephone line extending to the central station, of an annunciator thereat having an actuating coil in the telephone circuit and a retaining coil included with a source of electricity in a local circuit, means for closing said local circuit when connection is made with said line as the line of a called subscriber to thereby render said annunciator irresponsive to clearing out currents, and means for making connection between said line as the line of a calling subscriber and a second telephone line without closing said local circuit to thereby include the annunciator in the telephone circuit to respond to clearing out currents, substantially as described.

3. The combination with two telephone lines extending to the central station, of an annunciator thereat for each of said lines, said annunciators each comprising an actuating coil included in the telephone circuit, and a retaining coil included with a source of electricity in a local circuit, and means for connecting said telephone lines together at the central station and adapted to close the local circuit of one of said annunciators to render said annunciator irresponsive to clearing-out currents, but to leave the local circuit of the other annunciator open, whereby the latter annunciator remains in circuit to respond to clearing out currents, substantially as described.

4. The combination with a telephone line extending to switches at the several boards of an exchange and terminating in a plug at one of said boards, of an annunciator at the central station having an actuating coil in the telephone circuit and a retaining coil included with a source of electricity in a local circuit, means for closing said local circuit when a plug is inserted in one of the switches of the line to loop the line in circuit with another line, and means for maintaining said local circuit open when the terminal plug is inserted in the switch of a second telephone line, substantially as described.

In witness whereof I hereunto subscribe my name this 6th day of February, A. D. 1893.

ORO A. BELL.

Witnesses:
 ELLA EDLER,
 LUCILE RUSSELL.